(12) United States Patent
Erdely et al.

(10) Patent No.: US 7,349,536 B1
(45) Date of Patent: Mar. 25, 2008

(54) TECHNIQUES FOR PROVIDING UNINTERRUPTED DIGITAL COMMUNICATIONS TO CUSTOMERS COUPLED TO LOCAL LOOP GENERATION EQUIPMENT

(75) Inventors: Laszlo Erdely, Crofton, MD (US); Gregory Sherrill, Herndon, VA (US)

(73) Assignee: Verizon Services Corp., Arlington, VA (US)

( * ) Notice: Subject to any disclaimer, the term of this patent is extended or adjusted under 35 U.S.C. 154(b) by 0 days.

(21) Appl. No.: 09/386,775

(22) Filed: Aug. 31, 1999

(51) Int. Cl.
- *H04M 1/00* (2006.01)
- *H04M 9/00* (2006.01)
- *H04M 11/00* (2006.01)

(52) U.S. Cl. .............. 379/399.01; 379/93.05; 379/93.06; 379/413.02

(58) Field of Classification Search .......... 379/93.05, 379/93.06, 93.09, 167.05, 387.01, 390.02, 379/397, 399.01, 413.02, 413.03, 413.04
See application file for complete search history.

(56) References Cited

U.S. PATENT DOCUMENTS

| | | | |
|---|---|---|---|
| 4,759,059 A * | 7/1988 | Christensen | 379/161 |
| 4,937,855 A * | 6/1990 | McNab et al. | 379/103 |
| 4,987,586 A * | 1/1991 | Gross et al. | 379/93.09 |
| 5,003,580 A * | 3/1991 | Duong et al. | 379/93.09 |
| 5,255,267 A * | 10/1993 | Hansen et al. | 370/401 |
| 5,550,901 A * | 8/1996 | Williams | 379/93.05 |
| 5,848,150 A * | 12/1998 | Bingel | 379/399.01 |
| 5,943,404 A * | 8/1999 | Sansom et al. | 379/93.06 |
| 5,974,139 A * | 10/1999 | McNamara et al. | 379/399 |
| 6,301,340 B1 * | 10/2001 | Sansom et al. | 379/93.06 |
| 6,683,951 B1 * | 1/2004 | Getchell | 379/413.02 |

OTHER PUBLICATIONS

Alpha Communication, "OV-VPLP-SS St. Steel Entry Station, Product Specification Sheet, APS401" Rev. Jan. 12, 1998, one page.*

* cited by examiner

*Primary Examiner*—Binh K. Tieu

(57) ABSTRACT

Uninterrupted digital communications are provided between a central office and a customer premises by using a high-pass or bandpass filter to bypass local loop generation equipment. In many present-day telecommunications installations, local loop generation equipment may be placed in series with a communications path that runs between the central office and the customer premises. This communications path is adapted to convey digital signals as well as voice information and/or other types of baseband communications signals. In order to avoid interference between baseband signals and digital signals, each of these signals is allowed to occupy only a specified portion of the frequency spectrum. When activated, the local loop generation equipment breaks the entire communications path, interrupting voice signals, as well as any digital signals which may be carried thereon. The techniques disclosed herein solve the problem of interrupted digital communications by bridging a frequency-selective filter across the local loop generation equipment so as to provide an alternate path for digital signals around the activated local loop generation equipment. In cases where the digital signals occupy frequencies above baseband, the frequency selective filter may be implemented using a high-pass filter and/or a bandpass filter. In this manner, a digital communications path between the central office and the customer premises is provided at all times.

18 Claims, 1 Drawing Sheet

TECHNIQUES FOR PROVIDING UNINTERRUPTED DIGITAL COMMUNICATIONS TO CUSTOMERS COUPLED TO LOCAL LOOP GENERATION EQUIPMENT

FIELD OF THE INVENTION

The present invention relates generally to telephonic communications, and, more specifically, to the seamless integration of local-loop generation equipment, such as doorbell answering systems, with digital communications services such as DSL and ADSL.

BACKGROUND OF THE INVENTION

Ever-increasing numbers of telephone customers may be coupled to local loop generation equipment, examples of which are security systems, doorbell answering devices, and access control mechanisms. In particular, doorbell answering systems are commonly utilized in multi-family housing units. These systems generally place a switching mechanism in series with the tip/ring lines running from the telephone company central office to the customer premises. Normally, this switching mechanism is closed, completing a circuit between the telephone company central office and the customer premises. In this closed state, customers are able to communicate voice and/or data over their telephone lines as if the access control system was not even present. However, this communication is subject to interruption at any time.

Consider the illustrative example of FIG. 1 where the local loop generation equipment is a doorbell answering system 105. Each of a plurality of customer premises is served by a pair of terminals on a first portion of an RJ71C terminal block 107. For the sake of convenience, FIG. 1 shows only one customer premises, although it is to be understood that, in practice, multiple customer premises would likely be present. A set of terminals on a second portion of the RJ71C terminal block 103 is used to provide connections to central office 101. Of course, the organization of the RJ71C terminal block into first and second portions is for purposes of illustration, as the terminal block could be organized in any of various ways, to be determined by the requirements of a given system design. Moreover, other types of terminal blocks could be used in place of the RJ71C if desired.

The set of terminals on the first portion of the RJ71C terminal block 107 are connected to a conventional tip-ring wire pair. This wire pair is routed to a given customer premises. A signal splitter 109 which provides a given customer premises with an analog voice communications port and a digital communications port may or may not be used. The analog voice communications port is connected to a telephonic device 111 such as a touch-tone phone, and the digital communications port is connected to a digital communications device such as an ADSL modem 113. In the present example, the digital communications port is adapted to implement the ADSL (asymmetric digital subscriber loop) standard.

When a visitor wishes to notify a person at a selected customer premises of his or her presence, the visitor presses one or more keys on a keypad of intercom telephone 115. The doorbell answering system 105 responds to the key presses by opening up the circuit between the first portion of the RJ71C terminal block 107 and the central office 101, effectively disconnecting the telephone 111 and the ADSL modem 113 from the central office 101. At this time, the doorbell answering system provides a local loop between the visitor at intercom telephone 115 and the first portion of the RJ71C terminal block 107 routed to the selected customer premises.

This open circuit is something of a nuisance if it interrupts a voice call already in progress. However, the open circuit is more problematic in cases where the transfer of data is interrupted. In the present example, once the circuit between the central office 101 and the ADSL modem 113 is broken, the modem will disconnect from the telephone line routed to the first portion of the RJ71C terminal block 107. The subscriber loses data during this interruption, and may also be faced with the inconvenience of having to re-log into an online service.

As stated above, the circuit between the central office 101 and the customer is broken so that a local loop may be provided between the customer premises and the intercom telephone 115. After the circuit has been broken, the door answering system then feeds a ringing signal to the telephone line routed from the first portion of the RJ71C terminal block 107 to the subscriber's premises. When a person at the customer premises takes telephone 111 off-hook, voice communications are now enabled between this person and intercom telephone 115. If this person wishes to grant the visitor access, this person presses a specified DTMF tone sequence on the telephone keypad of telephone 111 or, alternatively, presses a lock release button separate and apart from the telephone system to grant the visitor access.

Although the foregoing example deals with local loop generation equipment in the form of a doorbell answering system, other types of local loop generation equipment present similar problems. Whenever the local loop generation equipment creates a local loop, digital communications between the customer and the central office are interrupted.

SUMMARY OF THE INVENTION

In view of the foregoing deficiencies of the prior art, it is an object of the invention to provide uninterrupted communications between a central office and a customer premises when local loop generation equipment is in use.

It is a further object of the invention to provide uninterrupted digital communications over a telephone line between a central office and a customer premises when local loop generation equipment is activated on this telephone line.

It is a still further object of the invention to provide uninterrupted ADSL (asymmetric digital subscriber loop) communications over a telephone line between a central office and a customer premises when a doorbell answering system activates a local loop on this telephone line.

In accordance with the objects of the invention, uninterrupted digital communications are provided between a central office and a customer premises by using a frequency-selective filter to bypass local loop generation equipment. The frequency selective filter is adapted to pass at least those frequencies which carry digital information. The local loop generation equipment is placed in series with a communications path that runs between the central office and the customer premises. The frequency selective filter is placed in parallel with the local loop generation equipment to provide a path for digital signals when the local loop generation equipment breaks the communications path between the central office and the customer premises.

Pursuant to a further embodiment of the invention, the communications path is adapted to convey digital signals as well as voice information and/or other types of baseband communications signals. In order to avoid interference between baseband signals and digital signals, each of these signals is allowed to occupy only a specified portion of the frequency spectrum. Analog voice band signals are limited to the frequency range of below about 4.0 KHz, whereas digital signals are allowed to occupy frequencies above about 20 Khz. The frequency selective filter is provided in the form of a high-pass and/or bandpass filter.

The foregoing frequency ranges are provided for purposes of illustration, it being understood that the principles of the invention are applicable to virtually any communications system and/or technique which provides a separation in the frequency domain.

BRIEF DESCRIPTION OF THE DRAWINGS

The foregoing and other objects and advantages of the present invention will become apparent to those skilled in the art upon reading the following detailed description of the preferred embodiments in conjunction with a review of the appended drawings in which.

DETAILED DESCRIPTION OF THE PREFERRED EMBODIMENTS

Figure 2:
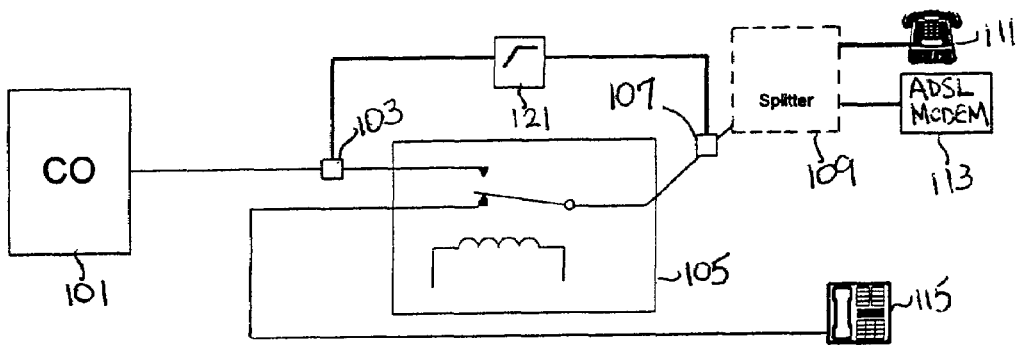
FIG. 2 is an electrical schematic diagram of a first system equipped to provide uninterrupted digital communications between a central office and a customer.

Refer to FIG. 2 which is an electrical schematic diagram of a first system equipped to provide uninterrupted digital communications between a central office 101 and a customer by using a frequency-selective filter 121 to bypass local loop generation equipment 105. The frequency selective filter 121 is adapted to pass at least those frequencies which carry digital information. The local loop generation equipment 105 is placed in series with a communications path that runs between the central office 101 and the customer premises. In the present example, this communications path includes a tip-ring wire pair that is routed from a first portion of an RJ71C terminal block 107 to a customer premises. When the local loop generation equipment 105 is not in the process of providing a local loop, this tip-ring wire pair is coupled to another tip-ring wire pair routed from a second portion of the RJ71C terminal block 103 to central office 101. In this manner, a complete communications path between the customer premises and the central office 101 is provided when local loop generation equipment 105 is not activated. The frequency selective filter 121 is placed in parallel with local loop generation equipment 105 to provide a path for digital signals when this local loop generation equipment is activated to break the communications path between the central office 101 and the customer premises.

In the illustrative example of FIG. 2, the local loop generation equipment is a doorbell answering system 105. Moreover, each of a plurality of customer premises is served by a pair of terminals on the first portion of an RJ71C terminal block 107. For the sake of convenience, FIG. 2 shows only one customer premises, although it is to be understood that, in practice, multiple customer premises would likely be present. A set of terminals on the second portion of the RJ71C terminal block 103 is used to provide connections to central office 101. Of course, the organization of the RJ71C terminal block into first and second portions is for purposes of illustration, as the terminal block could be organized in any of various ways, to be determined by the requirements of a given system design. Moreover, other types of terminal blocks could be used in place of the RJ71C if desired.

The set of terminals on the first portion of the RJ71C terminal block 107 are connected to a conventional tip-ring wire pair. This wire pair may be routed to a signal splitter 109 which provides a given customer premises with an analog voice communications port and a digital communications port. However, the use of splitter 109 is optional for many digital services. The analog voice communications port is connected to a telephonic device 111 such as a touch-tone phone, and the digital communications port is connected to a digital communications device such as an ADSL modem 113. In the present example, the digital communications port is adapted to implement the ADSL (asymmetric digital subscriber loop) standard.

Pursuant to a further embodiment of the invention, the communications path is adapted to convey digital signals as well as voice information and/or other types of baseband communications signals. In order to avoid interference between baseband signals and digital signals, each of these signals is allowed to occupy only a specified portion of the frequency spectrum. Analog voice band signals are limited to the frequency range of below about 4.0 KHz, whereas digital signals are allowed to occupy frequencies above about 20 Khz. The frequency selective filter is provided in the form of a high-pass and/or bandpass filter.

The foregoing frequency ranges are provided for purposes of illustration, it being understood that the principles of the invention are applicable to virtually any communications scheme wherein digital data and voice communications are separated in the frequency domain.

Figure 1:
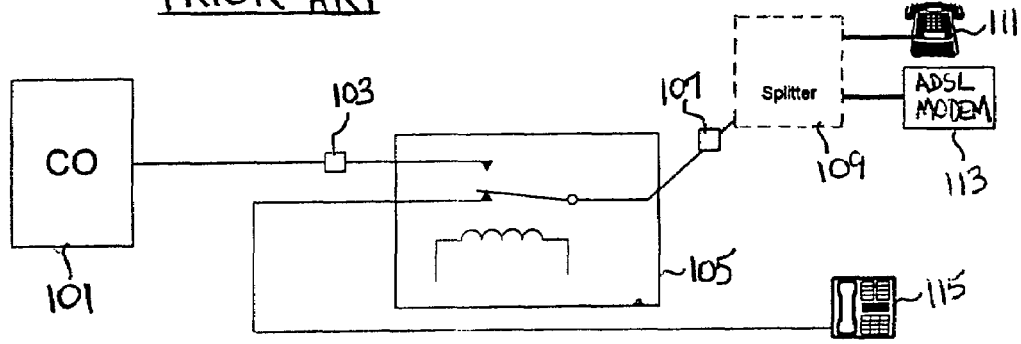
FIG. 1 is an electrical schematic diagram showing typical prior art interconnections between customers and a central office in an operational environment where local loop generation equipment is employed.
Figure 3:
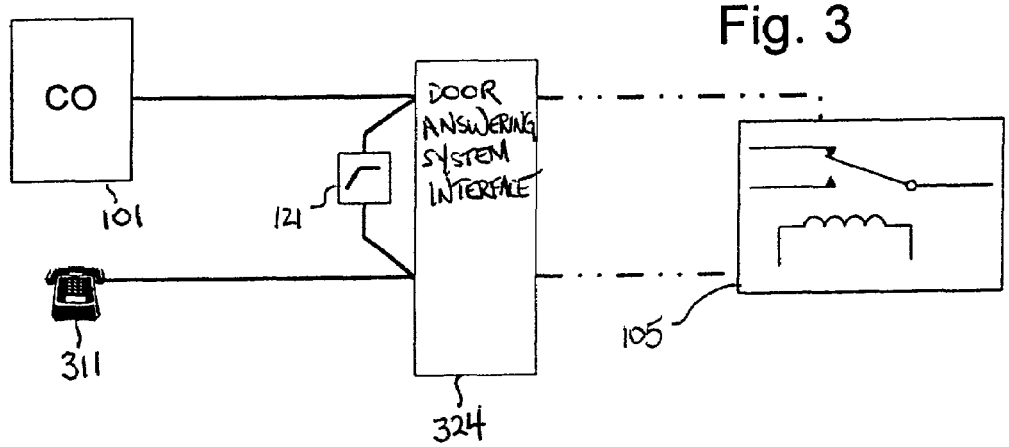
FIG. 3 is an electrical schematic diagram showing an illustrative technique for providing interconnections for the system of FIG. 2.

FIG. 3 is an electrical schematic diagram showing an illustrative technique for providing interconnections for the system of FIG. 2. More specifically, frequency selective filter 121 can be connected across the first and second portions 107, 103, respectively, of the RJ71C terminal block, thus providing an effective door answering system interface 324. The RJ71C terminal block also provides a convenient interface 324 for other system components such as telephone 311 (corresponding to telephone 111 of FIGS. 1 and 2), and the local loop generation equipment 105.

The foregoing examples are provided for illustrative purposes, it being understood that various modifications and adaptations of the foregoing concepts will become apparent to those skilled in the art upon review of the present disclosure. Accordingly, such modifications and adaptations are within the spirit and scope of the invention as set forth in the appended claims.

We claim:

1. A method of providing uninterrupted digital communications between a central office and a customer premises comprising the following steps:

placing a local loop generation mechanism in series with a communications path between the central office and the customer;

connection a frequency-selective filter in parallel with the local loop generation mechanism to provide a bypass path across the local loop generation mechanism.

2. A system for providing uninterrupted digital communications between a central office and a customer premises for use in conjunction with a local loop generation mechanism placed in series with a communications path between the central office and the customer;

the system CHARACTERIZED BY:

a frequency-selective filter connected in parallel with the local loop generation mechanism so as to provide a bypass path across the local loop generation mechanism.

3. The system of claim 2 wherein the frequency selective filter is adapted to pass at least those frequencies which carry digital information.

4. The system of claim 3 wherein the frequency selective filter is a high-pass filter.

5. The system of claim 3 wherein the frequency selective filter is a bandpass filter.

6. The system of claim 3 further providing an electromechanical connection mechanism for the local generation mechanism and the frequency selective filter.

7. The system of claim 6 wherein the connection mechanism is an RJ71C terminal block.

8. The system of claim 3 wherein the communications path is adapted to convey digital signals and voice information.

9. The system of claim 8 wherein the voice information is conveyed over the communications path as a baseband signal.

10. The system of claim 9 wherein the baseband signal occupies a first portion of the electromagnetic spectrum and the data signals occupy a second portion of the electromagnetic spectrum.

11. The system of claim 10 wherein baseband signals are limited to an approximate frequency range of about 20 Hz to about 3.3 KHz, and digital signals are allowed to occupy frequencies above about 20 Khz.

12. The system of claim 11 wherein the frequency selective filter is provided in the form of a high-pass and/or bandpass filter.

13. A frequency-selective communication method, comprising the steps of:

providing a communications path communicating information over at least two frequency ranges concurrently, wherein the at least two frequency ranges are defined by a first frequency range and a second frequency range, the second frequency range being generated by a local loop; and connecting a frequency selective filter in parallel with the communications path to provide for the interruption of the communications on the first frequency range while maintaining communications on the second frequency range.

14. A frequency-selective method for allowing interruption of communications within a first frequency range on a communications path while maintaining communications within a second frequency range on the communications path, comprising the steps of:

(a) placing a local loop generation mechanism in series with the communications path; and (b) connecting a frequency selective filter in parallel with the local loop generation mechanism.

15. A method of providing uninterrupted digital communications between a central office and a customer premises comprising the following steps:

placing a local loop generation mechanism in series with a communications path between the central office and the customer, said local loop generation mechanism configured to establish a closed local loop that does not pass through the central office;

connecting a frequency-selective filter in parallel with the local loop generation mechanism to provide a bypass path across the local loop generation mechanism.

16. A system for providing uninterrupted digital communications between a central office and a customer premises for use in conjunction with a local loop generation mechanism placed in series with a communications path between the central office and the customer;

the system CHARACTERIZED BY:

a frequency-selective filter placed in parallel with the local loop generation mechanism so as to provide a bypass path across the local loop generation mechanism;

wherein the frequency selective filter is adapted to pass at least those frequencies which carry digital information;

an electromechanical connection mechanism for the local generation mechanism and the frequency selective filter, wherein the connection mechanism is an RJ71C terminal block organized into a first portion and a second portion, the first portion providing one or more connections to the customer premises and the second portion providing one or more connections to the central office.

17. The system of claim 16 wherein the frequency selective filter is connected across the first and second portions of the RJ71C terminal block.

18. The system of claim 17 wherein the first portion of the RJ71C terminal block is coupled to a splitting mechanism adapted to provide the customer premises with a voice communications port and a data communications port.

* * * * *